United States Patent [19]

Abel

[11] Patent Number: 5,516,968
[45] Date of Patent: May 14, 1996

[54] METHODS OF DECONTAMINATING MERCURY-CONTAINING SOILS

[75] Inventor: Albert E. Abel, Powell, Ohio

[73] Assignee: Commodore Laboratories, Inc., Columbus, Ohio

[21] Appl. No.: 472,505

[22] Filed: Jun. 7, 1995

Related U.S. Application Data

[63] Continuation-in-part of Ser. No. 304,791, Sep. 12, 1994.

[51] Int. Cl.$^6$ ..................................................... G21F 9/00
[52] U.S. Cl. .................... 588/1; 134/2; 134/12; 209/5; 209/18; 976/DIG. 376
[58] Field of Search .............................. 588/1, 18; 134/2, 134/12; 71/903; 106/900; 209/5, 18

[56] References Cited

U.S. PATENT DOCUMENTS

| | | | |
|---|---|---|---|
| 5,110,364 | 5/1992 | Mazur et al. | 134/2 |
| 5,128,068 | 7/1992 | Lahoda et al. | 252/626 |
| 5,162,600 | 11/1992 | Cody et al. | 588/236 |
| 5,266,494 | 11/1993 | Lahoda et al. | 436/57 |
| 5,342,449 | 8/1994 | Holbein et al. | 134/2 |

Primary Examiner—Ngoclan Mai
Attorney, Agent, or Firm—Howard M. Ellis

[57] ABSTRACT

Soil including sand and clays contaminated with elemental mercury are decontaminated by forming slurries with anhydrous liquid ammonia. An ammoniacal liquid, such as anhydrous liquid ammonia facilitates decontamination by breaking up soil into fine slurries for releasing droplets of mercury metal. The high density of the mercury metal permits precipitation with larger soil particles and for recovery from soil particulates. Contaminated soils having mixed wastes comprising metallic mercury with organic compounds like PCBs are decontaminated first by slurring with anhydrous liquid ammonia to release droplets of mercury for coalescing and recovery. Solvated electrons are formed in the slurry in-situ by treating the slurry with an alkali metal or alkaline earth metal to reduce or degrade toxic organic compounds to more environmentally benign substances. Mixed waste comprising elemental mercury and nuclear waste, such as radionuclides like plutonium and uranium in the fines of soil and clay can also be concentrated to yield residual soil products which are sufficiently free of contaminants to allow reclamation. Economics are improved over aqueous systems since ammonia can be recovered and recycled. By concentrating nuclear wastes in soil fines space requirements ordinarily needed for storage of untreated soil and handling costs can be significantly reduced.

19 Claims, 2 Drawing Sheets

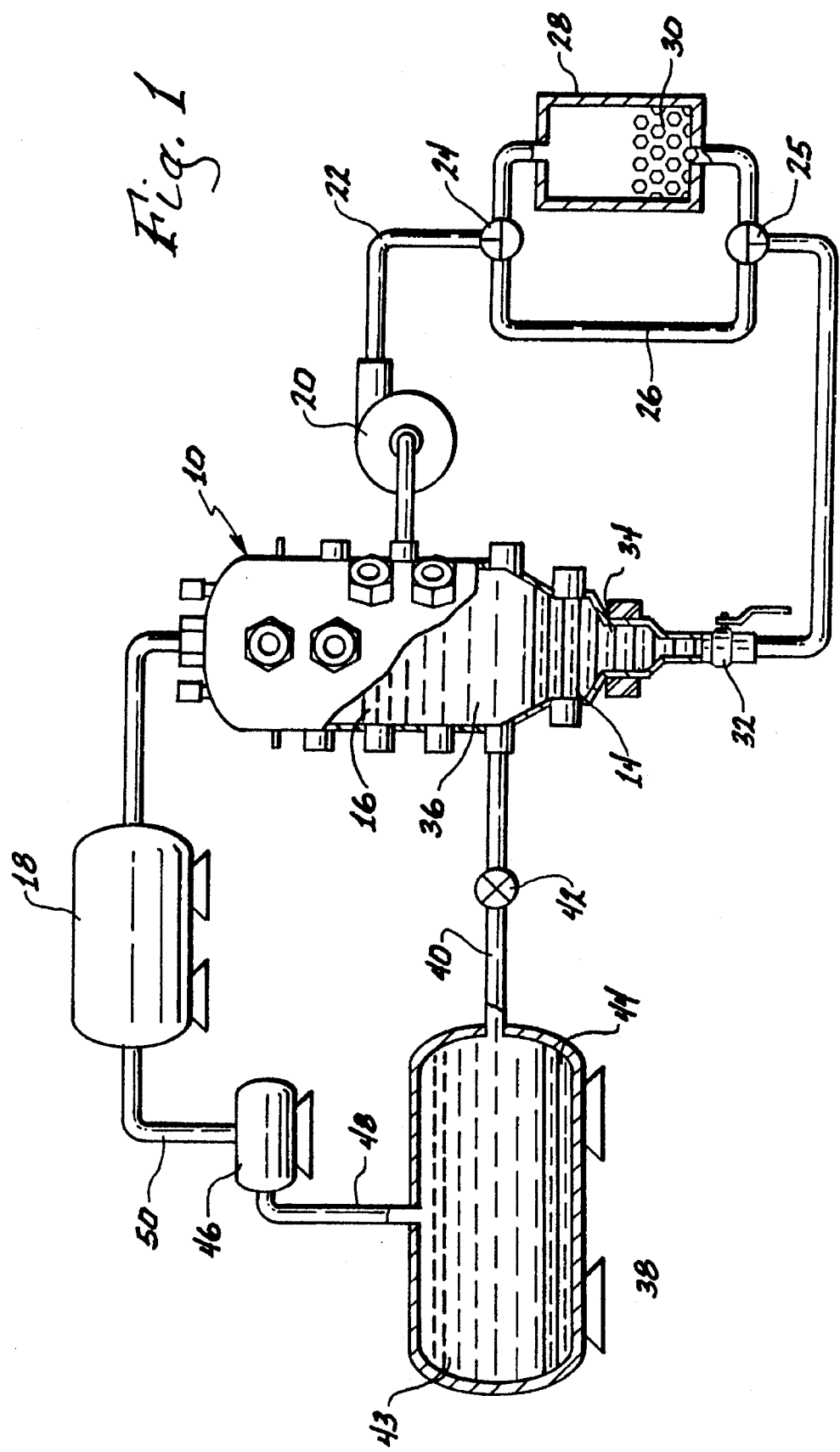

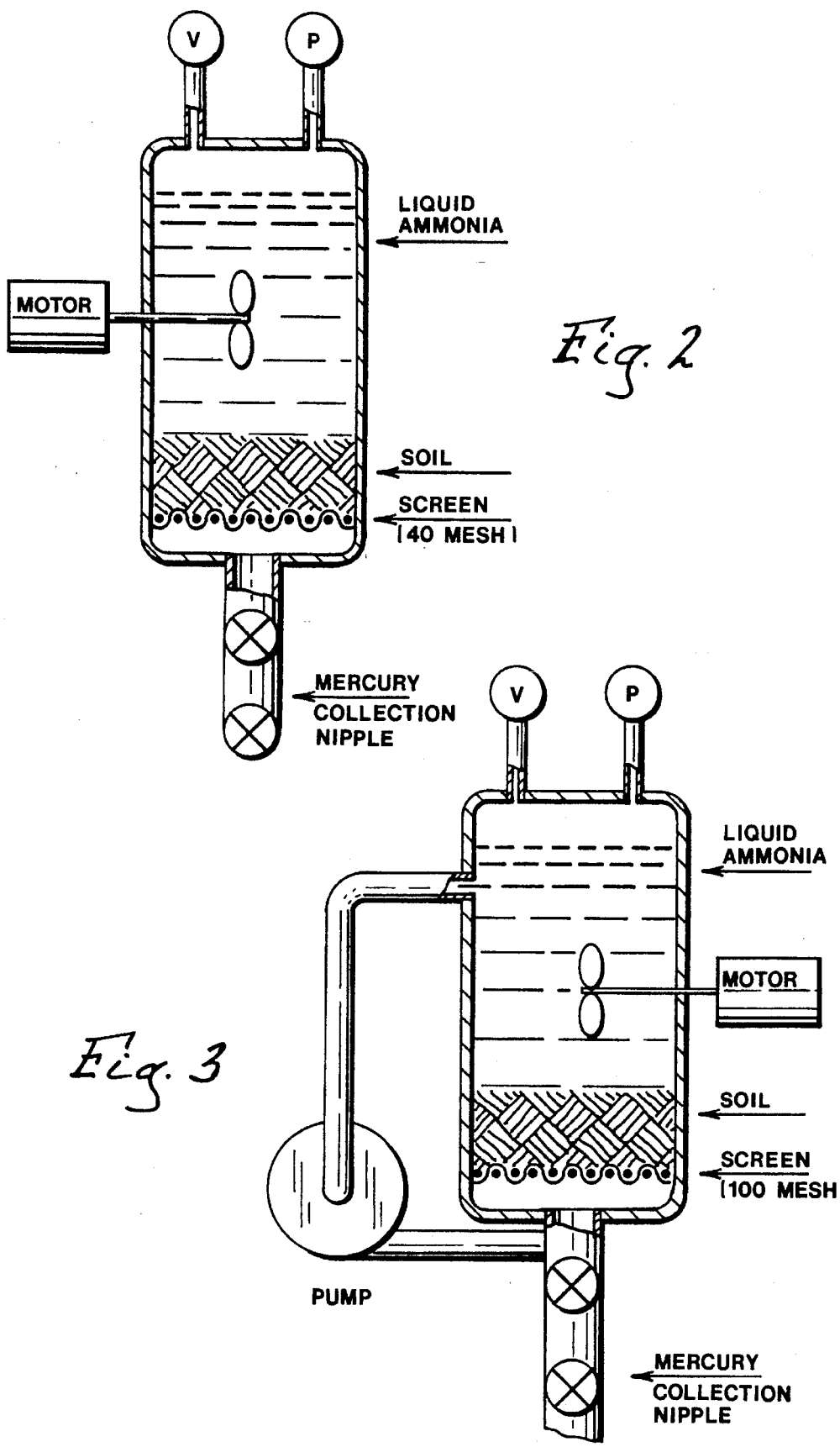

METHODS OF DECONTAMINATING MERCURY-CONTAINING SOILS

CROSS REFERENCE TO RELATED APPLICATION

This application is a continuation-in-part of Ser. No. 08/304,791, filed Sep. 12, 1994.

TECHNICAL FIELD

The present invention relates to methods of decontaminating soil, and more specifically, to the decontamination of nuclear waste-containing soils, mercury-containing soils and soils contaminated with mixed wastes by methods which also permit the reclamation of residual soil products.

BACKGROUND OF THE INVENTION

As a result of military testing programs involving the detonation of nuclear devices, both in the United States and abroad, the environment, and particularly vast areas of soil in testing zones have become contaminated with nuclear waste materials. In some instances, for example, detonation of a nuclear device failed to achieve the needed critical mass of the radioactive components, resulting in substantial quantities of enriched uranium and plutonium being scattered over wide areas of desert testing grounds. In addition to nuclear testing programs, contamination of soil with radioactive materials has occurred at nuclear weapon manufacturing sites, such as at Hanford, Wash.; Rocky Flats, Colo.; Savannah River, Ga.; Oak Ridge, Tenn., and elsewhere through spills or releases into the environment.

Efforts to successfully decontaminate these sites have proven difficult and extremely costly due to massive amounts of soil requiring treatment and/or storage. Cleanup has usually meant a slow and costly process where the contaminated soil is excavated and transferred to a different location for storage. Abandoned salt mines and mountain repositories have been proposed as storage facilities for nuclear wastes, but too often rejected later on for technical and/or political reasons. Because of a finite amount of space available for storage of nuclear waste materials progress in the reclamation of contaminated sites has been slow.

In an effort to mitigate the nuclear waste storage crisis systems for reducing bulk quantities of contaminated soil requiring storage have been proposed wherein the radioactive components are concentrated in a soil fraction. One system, for example, employs an aqueous washing process requiring the use of soil scrubbing chemicals, multiple separation steps, water treatment, and so on. Although quite effective in concentrating radioactive components in silt and clay fractions of soil, capital and operating costs per ton of soil treated are viewed as economically unattractive. Consequently, most methods proposed for concentrating nuclear waste have not received wide acceptance.

Like nuclear wastes, the contamination of soil with elemental mercury also poses serious health risks to humans, threatens serious harm to wild life and presents a long term threat to the environment. Instances of mercury contamination of the environment are well documented. One representative source of mercury contamination has been through the use of mercury electrolysis cells in the synthesis of chlorine and caustic soda. The mercury cell employs a mercury cathode so that the sodium metal produced at the cathode reacts promptly with the mercury to form an amalgam, NaHg, thus being separated from other products. Posterior treatment with water converts the NaHg amalgam into caustic soda, hydrogen and mercury metal, the latter of which is recycled for further use. While this type of electrolysis cell has been gradually withdrawn as an industrial process because of pollution of the environment with mercury, other applications of mercury besides electrodes have included photography, electric switches, control apparatuses, catalysts, and so on. They have contributed to contamination of lakes, oceans and soil. Decontamination of the environment of metallic mercury and its recovery has been a major problem.

Other related environmental problems have been the treatment of soil contaminated with "mixed wastes." The expression "mixed wastes" denotes wastes containing two or more separate classes of contaminates requiring destruction or removal from the environment. One representative example of soil contaminated with mixed wastes has been PCB-contaminated materials, such as dielectric fluids discharged onto soils also contaminated with elemental mercury. Together, they pose an especially difficult problem for treatment using conventional technologies. While mercury bearing soils might be land filled, the presence of PCBs eliminates land filling in anything other then a PCB-approved landfill, which is not permitted for other wastes. Therefore, land filling is normally not permitted. Conversely, PCB-contaminated soils can be incinerated, but the presence of mercury precludes this option because oxides of mercury formed during incineration are hazardous when released to the atmosphere. This dilemma has resulted in mixed wastes historically commanding a substantial premium for their treatment.

Accordingly, there is need for an innovative, cost-effective process for decontaminating soils containing nuclear waste materials, such as those generated at sites of nuclear weapon plants, nuclear testing sites, and wherever treatment calls for managing substantial volumes of soil contaminated with radioactive materials. The process should enable reduction of the space otherwise required for storage of untreated soils by concentrating in a small fraction of the soil while also permitting reclamation of these sites. Likewise, a mechanism is needed whereby elemental mercury and mixed wastes-containing mercury and other contaminants, such as organics like pesticides, dioxins, PCBs and/or nuclear wastes like radionuclides can be readily separated from soil for subsequent recovery and proper disposal.

SUMMARY OF THE INVENTION

It is therefore a principal object of the invention to provide improved, more economic methods for separating radioactive components from contaminated soil wherein the treated soil is made sufficiently free of the potentially toxic radioactive components as to permit reclamation of the soil. The expression "sufficiently free" is intended to mean soil treated according to the present invention so it (i) is practically devoid of all unwanted radioisotopes (radionuclides), or (ii) contains residual amounts of low-level radioisotopes allowing treated soil to be reclaimed as is, or (iii) contains amounts of low-level radioisotopes which can be diluted sufficiently with an inert material to reduce its activity to an acceptable level.

Expressions, such as "nuclear waste" and "radioactive waste" as recited in the specification and claims are intended to refer also to soils contaminated with isotopic forms of elements having unstable nuclei which disintegrate and emit energy most commonly as alpha particles, beta particles and gamma rays. They include mainly products or by-products of nuclear fission or unreacted products of a nuclear device. Representative examples include such radionuclides as $Cs^{137}$; $Co^{60}$; $K^{40}$; $Pu^{235}$; $U^{235}$; $U^{238}$; $Ru^{103}$; $Te^{99}$; Sr; Rb; Y; Re; Rh; Pd; Tc; Np and Am.

Methods of the invention provide for the recovery of nuclear waste materials in soil fractions, particularly in small, high surface area particles, such as soil fines and silt fractions of clay for subsequent storage or further treatment. By concentrating nuclear waste materials in soil fines and clay silt, for example, storage space requirements per ton of soil treated are significantly reduced, perhaps by as much as 90 percent over storage space requirements otherwise required for untreated soils.

Methods of the invention comprise the steps of:

(a) mixing an ammoniacal liquid with a soil contaminated with nuclear waste in a closed vessel to form an ammoniacal liquid-nuclear waste containing soil dispersion or slurry;

(b) allowing soil particles to selectively precipitate from the slurry or dispersion of step (a) to form a lower phase of soil particulates while forming an upper liquid-solid phase comprising soil fines dispersed in the ammoniacal liquid;

(c) separating the upper liquid-solid phase from the lower phase of soil particulates, the fines of the upper liquid-solid phase having the majority of the nuclear waste, or in other words, the lower phase is sufficiently free of the nuclear waste material to permit reclamation of the soil particulates, and (d) separating the ammoniacal liquid from the soil fines containing the nuclear waste material for disposal or further treatment of the fines.

The term "disposal" is intended to include storage of the nuclear waste-containing soil fines. The expression "further treatment" is intended to include any procedure which will modify the potentially toxic properties of the nuclear waste material, e.g., radionuclide material to substances of reduced toxicity and impact on the environment, or to materials which can be recovered as useful by-products. It will be understood, methods of storage and further treatment of the concentrated nuclear waste material do not constitute part of this invention. Such methods are known by persons skilled in the art.

Mazur et al in U.S. Pat. No. 5,110,364 disclose ammonia as a pretreatment in desorbing organic compounds, and particularly halogenated organic compounds like PCBs from soil, followed by chemical destruction of the compound by dehalogenation through a chemical reduction mechanism with solvated electrons. Mazur et al, however, fail to teach or suggest utilizing ammonia as a means of separating soil into fractions wherein the larger, lower surface area particulates are allowed to separate out from the less dense liquid ammonia-solid phase containing the smaller, higher surface area soil fines. In contradistinction, the methods of Mazur et al provide for treating "whole" soil in the reduction of the halogenated carbon compound contaminants without first isolating particles from the slurry containing the highest concentration of the contaminant.

Serendipitously, it was found that radionuclides appear to have a preferential affinity for the smaller, higher surface area fines and silts of soils, clays and sand. Hence, by isolating the fines and silt particulates, especially the smaller particles having higher surface areas relative to the particles precipitating out of ammonia-soil dispersions one, in effect, is selectively concentrating the nuclear waste material in the smallest volume of natural solid carrier material to effectively lessen the tonnage volume of material requiring storage or further treatment. Accordingly, it is a primary objective of the invention to provide an improved more economic method for concentrating a substantial portion of the nuclear waste material in a reduced soil fraction for more efficient management of soil cleanup projects involving large volumes of soil, so as to permit reclamation of major volumes of previously contaminated soil.

It is still a further object of the invention to optionally include the step of recovering and recycling for reuse in the foregoing process the ammonia from step (d), the recovery and recycling being performed by methods already known in the art. For purposes of this invention, expressions like "liquid ammonia" and "ammoniacal liquid" as used herein are intended to include liquid ammonias like anhydrous liquid ammonia, ammonia-containing solutions, such as aqueous ammonia solutions, and so on.

It is still a further object to provide an additional embodiment of the invention for decontaminating soil containing nuclear waste by the steps of:

(a) mixing a liquid ammonia or ammoniacal liquid with soil contaminated with nuclear waste in a closed vessel to form an ammonia-nuclear waste-containing soil dispersion or slurry;

(b) treating the dispersion or slurry of step (a) with solvated electrons by contacting with a reactive metal;

(c) allowing soil particles to selectively precipitate from the dispersion or slurry of step (b) to form a lower solid phase of soil particulates while forming an upper liquid-solid phase comprising soil fines suspended in the liquid ammonia or ammoniacal liquid;

(d) separating the upper liquid-solid phase from the lower solid phase of soil particulates, the lower solid phase of soil particulates being sufficiently free of the nuclear waste, and (e) separating the liquid ammonia or ammoniacal liquid from the soil fines for disposal or further treatment of the fines.

While this inventor has observed that ammonia has a unique ability to form very fine slurries when mixed with soils, it was observed that dispersions of soil appear to be further altered by some mechanism not fully understood, when in the presence of solvated electrons formed by dissolving metal reactions with ammonia. That is, by contacting the ammoniated soil dispersion with either an alkali or alkaline earth metal, solvated electrons are formed in the mixture, in-situ. The solvated electrons appear in some instances to optimize separation of smaller soil fines. In some instances where particle size cross-section is larger than desired, electrons solvated in liquid ammonia appear to provide more optimal demarcation and separation of the smaller fines containing contaminant materials disclosed herein from other particles of the slurry.

As in the first embodiment of the invention, the foregoing second embodiment of the invention contemplates the step of recovering and recycling the ammoniacal liquid from step (e) for reuse. Similarly, the precipitated residual solid soil particles of step (d) are "sufficiently free" of radioisotopes to permit reclamation of large bulk volumes of soil.

In accordance with the invention, improved methods are also contemplated for the decontamination of soil containing droplets of liquid mercury metal by the steps of:

(i) mixing in a closed vessel an ammoniacal liquid, such as anhydrous liquid ammonia, with a contaminated soil comprising bead-like droplets of liquid mercury to form an ammonia-mercury-soil dispersion or slurry;

(ii) allowing soil particles and the mercury to precipitate from the ammonia-mercury soil dispersion or slurry of step (i) to form a lower phase of soil particulates comprising mercury droplets and an upper liquid-solid phase comprising soil fines dispersed in the liquid ammonia, and (iii) allowing the mercury droplets to coalesce and separate from the lower phase of soil particulates for collection.

Because of the very high density of mercury, almost 14 times that of water, it can be conveniently separated from the soil and collected. The coalesced liquid mercury readily precipitates from the mixture and collects in the bottom of the vessel for convenient removal via the bottom drain valve.

As with other embodiments of the invention previously described, methods of decontaminating soil with an ammoniacal liquid preferably includes the step of separating the ammoniacal liquid from the soil fines, recovering and recycling the ammoniacal liquid. This would include separation of the ammonia from soil fines by distillation means. The ammonia can also be separated from the upper soil fines by evaporation and reliquified by ammonia compressor means using processes and equipment known in the art.

It is yet a further aspect of the invention to provide for the treatment of soil comprising "mixed waste" wherein a slurry or dispersion of the contaminated soil is formed preferably with anhydrous liquid ammonia for separation, and recovery of the contaminates. In addition to droplets of liquid mercury, soils can also be contaminated with nuclear waste comprised of a radionuclide or radioactive isotopic metal. They are generally intended to include metals of the actinide series, such as uranium, plutonium, thorium and mixtures of the same. An upper liquid-solid phase comprising a slurry of soil fines contains most of the nuclear waste. The soil particulates of the lower solid phase contains the very dense mercury droplets which coalesce for separation and recovery.

Other mixed waste includes organic compounds, non-halogenated compounds, and particularly halogenated organic compounds such as PCBs, dioxins, pesticides, including insecticides, herbicides, and so on. Thus, in addition to mercury metal contamination the invention contemplates treatment of soils that have also become contaminated with chemical compounds, and compounds which can be degraded or otherwise reduced to simpler substances of lesser toxicity.

The ammoniacal liquid-mercury-organic compound-containing soil dispersion of step (i) above is treated with a reactive metal, such as alkali metal, alkaline earth metal and aluminum to form solvated electron in-situ. The solvated electrons in the soil contaminated with mixed waste reduces or otherwise degrades the organic compound while the mercury droplets precipitate to the lower solid phase of soil particulates and coalesce for removal at the bottom of the closed vessel.

BRIEF DESCRIPTION OF THE DRAWINGS

For a further understanding of the invention and its characterizing features reference should now be made to the accompanying drawings wherein:

FIG. 1 is a schematic of a best mode for practicing the invention according to Example I below;

FIG. 2 is diagrammatic view of a laboratory scale reactor in which soil contaminated with mercury was treated according to the method of Example II, and FIG. 3 is a diagrammatic view of a laboratory reactor employed in purifying soil contaminated with mercury according to the method of Example III.

DESCRIPTION OF THE PREFERRED EMBODIMENTS

The invention relates to improved methods for separating from soil unwanted nuclear waste material, particularly the radionuclides as previously disclosed, by concentrating in very small particles or fines of soil or clay. The concentrated radionuclide-containing fines thus are in a state which permits more efficient disposal, such as by storage, or for further treatment to modify the radionuclides to less toxic and more environmentally benign substances.

The methods are based on the observation that ammonia liquids and especially anhydrous liquid ammonia possess the unique ability to break up soils into very fine slurries. It was also found that suspensions of what appear to be extremely fine particles of soil can be prepared by mixing with ammonia. In the methods, nuclear waste-contaminated soils, for instance, are mixed, preferably with anhydrous liquid ammonia, to form finely-dispersed suspensions or slurries. Because of the lower density of ammonia relative to water, significantly smaller soil particles were found to remain in solution, and particles which would otherwise be suspended in water readily precipitate from the dispersion. The larger bulk fraction of the soil consisting of larger precipitated particles are sufficiently free of the radionuclide or other contaminant as to permit recycling and reclaiming of large volumes of the treated soil.

Unlike nuclear waste in which the bulk of the contaminant is concentrated in the smaller soil fines in the upper liquid-solid phase of the ammonia-soil slurry, in treating soil contaminated with metallic mercury, droplets of the metal readily precipitate out of solution with the larger soil particulates and coalesce at the bottom of the vessel. Because of the very high density of the mercury, droplets collect in the lower most region of the vessel for recovery and reuse. The liquid ammonia, as in the case of nuclear waste contaminated soil, is believed to also play an important role in breaking up soil into finely dispersed slurries for facilitating separation and decontamination of the soil of finely dispersed droplets of mercury.

Advantageously, soils contaminated with mixed waste, i.e., soil comprising at least two separate classes of contaminants, particularly elemental mercury and radioactive waste, are especially well suited for decontamination according to the instant invention. The bulk of the radioactive waste becomes separated into the smaller soil fines in the upper liquid-solid phase of the slurry, while the mercury contaminant readily precipitates out of the slurry with the larger soil particulates and into the bottom end of the vessel where the coalesced liquid metal is recovered. The upper liquid-solid phase comprising the ammonia, soil fines and radioactive waste is withdrawn from the vessel where the ammonia is evaporated, and the smaller soil fines and nuclear waste stored or further processed. The bulk of the soil is thus reclaimed.

Soil contaminated with mercury-containing mixed waste and organic compound(s), such as halogenated carbon compounds, and particularly polyhalogenated organic compounds, e.g., PCBs, can also be treated to form chemically modified substances and made essentially nontoxic. The mercury-organic compound-contaminated soil is similarly slurried in a closed vessel. The anhydrous liquid ammonia aids in breaking up the soil and in the desorption of the toxic halogenated organic compound from the soil particulates. In addition, the ammonia-containing soil slurry is treated wherein alkali metal, like sodium, potassium and lithium, or alkaline earth metal, such as calcium, magnesium, etc., become solvated in a dissolving metal reaction. The slurry should contain solvated electrons in sufficient concentration to reduce the polyhalogenated organic compound contaminant to a substance which is more environmentally friendly. Typically, this means an electron concentration of about 0.1 to about 2.0 molar. In each instance, the amount of metal needed is that required to produce sufficient electrons to react, and chemically reduce the halogenated contaminant. The formation of solvated electrons and their use are generally described in U.S. Pat. No. 5,110,364, the contents of which are incorporated-by-reference herein.

Advantageously, the toxic organic compound need not be separated from the soil, but the soil containing the mercury metal and organic compound can be effectively pretreated with the liquid ammonia, the mercury droplets allowed to separate out and the soil-ammonia slurry-containing the organic compound treated with a reactive metal, previously disclosed, to form useful solvated electrons in the slurried soil.

The following specific examples demonstrates the invention, however, it is to be understood they are for illustrative purposes only and do not purport to be wholly definitive as to conditions and scope.

EXAMPLE I

Methods of the invention can be carried out by means of a system, such as that illustrated by FIG. 1. A closed reactor 10 is utilized as a mixing vessel for nuclear waste contaminated soil 14 positioned at the bottom of the vessel. The term "soil" is intended to have its ordinary understood meaning, and includes one or more components in varying proportions, such as of clay, stone, disintegrated rock particles or sand, organic matter, along with varying amounts of water and the like. Obviously, soil compositions will vary widely depending on source and location. For instance, soils from desert or other arid locations are mainly sandy compositions with little organic material. One representative soil from the State of Ohio known as Ohio Loam was found to have an analysis of 35% sand, 32% silt, 33% clay and 4.1% organic matter and have a pH 7.7. By contrast soil from Oak Ridge, Tenn. was found to contain only 1% sand, 26% silt, 73% clay, no organic matter, and have a pH of 5.2. In sum, the term "soil" for purposes of this invention is intended to have a broad compositional makeup, including varying ranges of clay, disintegrated rock/sand particulates, organic matter, siltfines, moisture and so on. This would include soils which are mainly clay or sand.

Anhydrous liquid ammonia 16 or a solution of liquid ammonia containing a small amount of water is introduced to closed reactor 10 from ammonia storage vessel 18. Once filled, liquid ammonia is withdrawn from reactor 10 from below the surface of the liquid by circulating pump means 20 positioned in outlet line 22. The flow of ammonia is directed by means of 3-way diverter valves 24–25 to either by-pass line 26 or to solvator 28 containing a bed of reactive metal 30, such as alkali or alkaline earth metals or mixtures of the same. Suitable representative metals include sodium, potassium, lithium, calcium and magnesium. Aluminum would also a suitable reactive metal. By circulating ammonia 16 through a bed of metal in reactor 28 solvated electrons are formed in-line. This avoids the problems associated with injecting metal rods or other metal sources directly to reaction vessel 10. Accordingly, methods of the present invention contemplate the option of enhanced particle size demarcation and separation of radioactive components in fines of soil and clay with ammonia and electrons solvated in the ammonia.

Whether ammonia circulates through by-pass line 26 or through solvator 28 the solution is recirculated to the bottom of reactor 10 through valve 32, setting up a fluidized flow pattern in the reactor. This produces a mixing action of the soil and ammonia solution and/or solvated electrons to form a slurry. Once the soil has been uniformly dispersed in the ammonia, pump 20 is deactivated to allow the dispersion to undergo phase separation, i.e. a lower solid phase and an upper liquid-solid phase. Large particulates of the dispersion precipitate out as solid phase 34 in the bottom of reactor 10, and are sufficiently free of radionuclide contaminants, the latter being concentrated in a smaller soil fraction consisting of fines or silt dispersed in the ammonia solution as upper liquid-solid phase 36.

The slurry of suspended particle fines forming the upper liquid-solid phase 36 is withdrawn from reactor vessel 10 to evaporator tank 38 via line 40 by opening valve 42. Ammonia 43 is evaporated to separate it from radioactive fines 44. Optionally, the ammonia can be transferred via line 48 to compressor 46 for reliquification if it is desired to recycle the ammonia for further use in the decontamination process. The liquified ammonia is then transferred to ammonia storage tank 18 through line 50.

Thus, the methods of the disclosed invention provide the advantages of separating nuclear waste by means of smaller particles than relied on using aqueous based systems; permits recycling of ammonia not otherwise achieved with systems relying on more costly scrubbing chemicals; provides means for readily separating fines from liquid ammonia; eliminates transport and storage of water to desert locations, and provides additional means for controlling particle sizes within a predetermined range with solvated electrons.

EXAMPLE II

In order to demonstrate the separation of mercury from soil a 100 gram sample of soil doped with approximately 20,000 ppm (about 2%) of elemental mercury was placed into a laboratory pressure vessel having a configuration according to that of FIG. 2.

Anhydrous liquid ammonia was introduced into the pressure vessel fluidizing the soil and creating a slurry of soil and ammonia. The mixer was then actuated and the soil and ammonia allowed to mix for two minutes. During this time, venting (V) of the ammonia was initiated to generate turbulence in the vessel which could continue once the mixer was turned off.

Once the mixer was turned off the region of the lower most mercury collection nipple was heated to promote bubbling from the bottom of the reactor to promote separation of the smaller soil particles and allow mercury to settle down into the region of the collection nipples. Heating was continued for about 15 minutes and then the reactor was allowed to sit overnight while the balance of the ammonia boiled off.

The following morning, the reactor was opened by first opening the mercury collection nipple and removing the bottom-most portion of soil which had settled. Silver droplets of mercury were observed. Similarly, a sample of soil was taken from the upper layer of soil in the reactor and closely examined. Silver droplets of mercury could not be observed.

EXAMPLE III

In a further experiment, 100 grams of mercury-doped soil was introduced into a pressurized vessel containing screens and a recirculating pump as illustrated by FIG. 3.

Anhydrous liquid ammonia was then introduced into the reactor and the pump actuated to promote turbulence. The pump was operated for approximately 20 minutes circulating the ammonia and then shut off. The ammonia was allowed to vent (V) from the reactor overnight.

The following day, the reactor was opened and the soil removed for examination. Surprisingly, the mercury had separated from the soil, and collected on the 100 mesh screen, rather than passing through and collecting in the region of the mercury collection nipple. The fact that the mercury had collected on the screen demonstrated the effectiveness of liquid ammonia in separating mercury from soil.

While the invention has been described in conjunction with various embodiments, they are illustrative only. Accordingly, many alternatives, modifications and variations will be apparent to persons skilled in the art in light of the foregoing detailed description, and it is therefore intended to embrace all such alternatives and variations as to fall within the spirit and broad scope of the appended claims.

I claim:

1. A method of decontaminating mercury-containing soil, which comprises the steps of:
   (i) mixing in a closed vessel an ammoniacal liquid with a contaminated soil comprising mercury to form an ammoniacal liquid-mercury-containing soil dispersion or slurry;
   (ii) allowing soil particles and the mercury to precipitate from the slurry or dispersion of step (i) to form a lower phase of soil particulates comprising mercury droplets and an upper liquid-solid phase comprising soil fines dispersed in said ammoniacal liquid, and
   (iii) allowing said mercury droplets to coalesce for recovery from said lower phase of soil particulates.

2. The method of claim 1 wherein the ammoniacal liquid is anhydrous liquid ammonia or an ammonia containing solution.

3. The method of claim 1 including the step of separating said ammoniacal liquid from the soil fines, recovering and recycling said ammoniacal liquid.

4. The method of claim 1 wherein the mercury droplets of step (iii) are collected in the bottom of the closed vessel.

5. The method of claim 1 wherein the soil of step (i) comprises a mixed waste.

6. The method of claim 5 including the steps of treating the ammoniacal liquid-mercury-containing soil dispersion or slurry comprising the mixed waste of step (i) with solvated electrons by contacting with a reactive metal.

7. The method of claim 6 wherein the reactive metal is a member selected from the group consisting of alkali metal, alkaline earth metal and aluminum.

8. The method of claim 6 wherein the mixed waste comprises mercury and an organic compound.

9. The method of claim 8 wherein the organic compound is a halogenated organic compound.

10. The method of claim 9 wherein the halogenated organic compound is a pesticide.

11. The method of claim 9 wherein the halogenated organic compound is a PCB.

12. The method of claim 5 wherein the mixed waste comprises mercury and a nuclear waste.

13. The method of claim 6 wherein the mixed waste comprises mercury, PCBs and nuclear waste.

14. The method of claim 12 wherein the nuclear waste comprises at least one radionuclide.

15. The method of claim 14 wherein the radionuclide is a member selected from the group consisting of uranium, plutonium and mixtures thereof.

16. The method of claim 12 wherein the nuclear waste is concentrated substantially in the soil fines of the upper liquid-solid phase.

17. The method of claim 6 wherein the liquid ammonia of step (i) is anhydrous liquid ammonia or an ammonia-containing solution.

18. The method of claim 4 wherein the contaminated soil of step (i) comprises at least one member selected from the group consisting of clay, disintegrated rock and organic matter.

19. The method of claim 3 including the step of separating the ammoniacal liquid from the soil fines by distillation means.

* * * * *